United States Patent
Itakura et al.

(10) Patent No.: US 11,501,209 B2
(45) Date of Patent: Nov. 15, 2022

(54) BEHAVIOR IDENTIFICATION METHOD, BEHAVIOR IDENTIFICATION DEVICE, NON-TRANSITORY COMPUTER-READABLE RECORDING MEDIUM RECORDING THEREIN BEHAVIOR IDENTIFICATION PROGRAM, MACHINE LEARNING METHOD, MACHINE LEARNING DEVICE, AND NON-TRANSITORY COMPUTER-READABLE RECORDING MEDIUM RECORDING THEREIN MACHINE LEARNING PROGRAM

(71) Applicant: Panasonic Intellectual Property Corporation of America, Torrance, CA (US)

(72) Inventors: Kousuke Itakura, Osaka (JP); Ko Mizuno, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 486 days.

(21) Appl. No.: 16/680,656

(22) Filed: Nov. 12, 2019

(65) Prior Publication Data
US 2020/0160218 A1    May 21, 2020

(30) Foreign Application Priority Data
Nov. 20, 2018    (JP) .............................. JP2018-217156

(51) Int. Cl.
*G10L 25/18* (2013.01)
*G06N 20/00* (2019.01)
*G06V 40/20* (2022.01)

(52) U.S. Cl.
CPC .............. *G06N 20/00* (2019.01); *G06V 40/20* (2022.01); *G10L 25/18* (2013.01)

(58) Field of Classification Search
CPC ............................... G06N 20/00; G06V 40/20
See application file for complete search history.

(56) References Cited

U.S. PATENT DOCUMENTS

2008/0304672 A1  12/2008  Yoshizawa et al.
2019/0188468 A1   6/2019  Komatsu et al.

FOREIGN PATENT DOCUMENTS

| | | | |
|---|---|---|---|
| JP | 2011237865 A | * | 11/2011 |
| JP | 2015-28579 | | 2/2015 |
| WO | 2007/080764 | | 7/2007 |
| WO | 2017/217412 | | 12/2017 |

OTHER PUBLICATIONS

Michele Valenti et al., "A Neural Network Approach for Sound Event Detection in Real Life Audio", 2017 25th European Signal Processing Conference (EUSIPCO), Aug. 2017, pp. 2754-2758.

* cited by examiner

*Primary Examiner* — David L Ton
(74) *Attorney, Agent, or Firm* — Wenderoth, Lind & Ponack, LLP (57) ABSTRACT

In a behavior identification method, surrounding sound is acquired, a feature value that is specified by a spectrum pattern included in spectrum information generated from sound made by a person performing a predetermined behavior is extracted from the sound acquired, the predetermined behavior is identified by the feature value, and information indicating the predetermined behavior identified is output.

8 Claims, 6 Drawing Sheets

BEHAVIOR IDENTIFICATION METHOD, BEHAVIOR IDENTIFICATION DEVICE, NON-TRANSITORY COMPUTER-READABLE RECORDING MEDIUM RECORDING THEREIN BEHAVIOR IDENTIFICATION PROGRAM, MACHINE LEARNING METHOD, MACHINE LEARNING DEVICE, AND NON-TRANSITORY COMPUTER-READABLE RECORDING MEDIUM RECORDING THEREIN MACHINE LEARNING PROGRAM

FIELD OF THE INVENTION

The present disclosure relates to a behavior identification method and a behavior identification device that identify a behavior of a person by sound made by the person, and a non-transitory computer-readable recording medium recording therein a behavior identification program. The present disclosure also relates to a machine learning method and a machine learning device that machine-learn a behavior identification model for identifying a behavior of a person, and a non-transitory computer-readable recording medium recording therein a machine learning program.

BACKGROUND ART

There has been conventionally proposed an identification device that identifies a behavior of a person by sound. The identification device causes a behavior identifier to learn in advance using the sound of an identification target behavior and thus is capable of estimating a behavior of a person in a target space only from the sound.

For example, "A Neural Network Approach for Sound Event Detection in Real Life Audio" (M. Valenti, D. Tonelli, F. Vesperini, E. Principi, and S. Squartini, 2017 25th European Signal Processing Conference (EUSIPCO), issued on August 2017, p. 2754-2758) (hereinafter, referred to as "Non-Patent Literature 1") discloses a method of estimating a daily life behavior from sound using deep learning.

However, the conventional identification device can identify the identification target behavior but may malfunction when a behavior other than the identification target behavior is performed.

Even with the technology disclosed in Non-Patent Literature 1, the conventional identification device is difficult to prevent malfunctions in response to a behavior other than the identification target behavior and identify the identification target behavior. That is to say, Non-Patent Literature 1 describes a method of accurately identifying sound made by the identification target behavior but does not describe a method of preventing malfunctions in response to sound made by a behavior other than the identification target behavior.

SUMMARY OF THE INVENTION

The present disclosure has been achieved to solve the above problems, and an object of the present disclosure is to provide a behavior identification method, a behavior identification device, a non-transitory computer-readable recording medium recording therein a behavior identification program, a machine learning method, a machine learning device, and a non-transitory computer-readable recording medium recording therein a machine learning program, where if surrounding sound acquired includes sound other than sound of an identification target behavior such as noise, the identification target behavior can be accurately identified from the surrounding sound.

A behavior identification method according to an aspect of the present disclosure is a behavior identification method in a behavior identification device that identifies a behavior of a person by sound made by the person, the behavior identification method including acquiring surrounding sound, extracting a feature value that is specified by a spectrum pattern stored in a storage unit and included in spectrum information generated from sound made by a person performing a predetermined behavior from the sound acquired, identifying the predetermined behavior by the feature value, and outputting information indicating the predetermined behavior identified.

DESCRIPTION OF EMBODIMENTS

Knowledge on which the Present Disclosure Relies

When a person performs an identification target behavior, an identification device is capable of identifying which identification target behavior the performed behavior matches. However, when the person performs a behavior that is not the identification target behavior, the identification device is difficult to estimate that the behavior does not match any identification target behaviors.

For example, when behaviors "walk" and "sit down" are the identification target behaviors, these two behaviors can be identified. However, when a behavior "run" is performed, the identification device cannot determine that the behavior "run" is not the behavior "walk" or the behavior "sit down". In order to prevent such a situation, there is a method of preparing the sound of a behavior assumed to be out of the identification target behavior as learning data and then performing learning so as to identify the behavior out of the identification target behavior by the sound in the learning data. However, it is difficult to prepare the sound of all behaviors assumed as the learning data.

Consequently, when acquired sound includes only the sound of an identification target behavior, the conventional identification device is capable of identifying the identification target behavior. However, when the acquired sound includes the sound of a behavior other than the identification target behavior, the accuracy of identifying the behavior may be reduced.

In order to solve the above problems, a behavior identification method according to an aspect of the present disclosure is a behavior identification method in a behavior identification device that identifies a behavior of a person by sound made by the person, the behavior identification method including acquiring surrounding sound, extracting a feature value that is specified by a spectrum pattern stored in a storage unit and included in spectrum information generated from sound made by a person performing a predetermined behavior from the sound acquired, identifying the predetermined behavior by the feature value, and outputting information indicating the predetermined behavior identified.

According to this configuration, the feature value specified by the spectrum pattern included in the spectrum information generated from the sound made by the person performing the predetermined behavior is extracted from the surrounding sound acquired and the predetermined behavior is identified by the feature value. Consequently, if sound other than the sound of an identification target behavior such as noise is included in the surrounding sound acquired, the identification target behavior can be accurately identified from the surrounding sound.

According to the behavior identification method described above, in the identification, the predetermined behavior may be identified by inputting the feature value into a behavior identification model established by machine learning using the feature value as an input value and the predetermined behavior as an output value.

According to this configuration, the predetermined behavior is identified by inputting the feature value into the behavior identification model established by machine learning using the feature value as an input value and the predetermined behavior as an output value. Consequently, the predetermined behavior can be easily identified by the feature value extracted.

In the behavior identification method described above, the spectrum information may be a frequency spectrogram, the spectrum pattern may be a frequency pattern repeatedly appearing in the frequency spectrogram, and the feature value may be a level of the frequency pattern at each time point.

According to this configuration, the feature value specified by the frequency pattern repeatedly appearing in the frequency spectrogram is the level of the frequency pattern at each time point and the feature value is not affected by the sound other than the sound of the identification target behavior such as noise. Consequently, the identification target behavior can be reliably identified even in an environment with a variety of noise.

The behavior identification method described above may further include acquiring sound made by the person performing the predetermined behavior as learning sound, and estimating a spectrum pattern from spectrum information generated from the learning sound acquired and storing the spectrum pattern estimated in the storage unit.

According to this configuration, the spectrum pattern estimated based on the learning sound that is the sound made by the person performing the predetermined behavior is stored in advance in the storage unit, and thus the feature value can be extracted using the spectrum pattern.

The behavior identification method described above may further include acquiring a behavior label for specifying the predetermined behavior when the learning sound is made, extracting a feature value that is specified by the spectrum pattern stored in the storage unit from the learning sound acquired, and machine-learning a behavior identification model by using the feature value extracted from the learning sound as an input value and the behavior label acquired as an output value. In the identification, the predetermined behavior may be identified by inputting the feature value extracted from the sound acquired into the behavior identification model.

According to this configuration, the behavior identification model is machine-learned by using the feature value extracted from the learning sound as an input value and the behavior label acquired as an output value. Consequently, the predetermined behavior can be easily identified by inputting the feature value extracted from the surrounding sound into the behavior identification model.

The behavior identification method described above may further include, after identifying the predetermined behavior, reading the spectrum pattern from the storage unit, estimating a spectrum pattern that has a minimum difference to the spectrum pattern read and reproduces the sound acquired, and updating the spectrum pattern stored in the storage unit to the spectrum pattern estimated.

According to this configuration, if the sound of the identification target behavior changes due to an environmental change, by estimating the spectrum pattern again using an identification result and updating the spectrum pattern stored in the storage unit to the spectrum pattern estimated, the environmental change can be handled.

In the behavior identification method described above, the storage unit may store a plurality of spectrum patterns so as to correspond to a plurality of behaviors, respectively, in the update, the spectrum pattern corresponding to the predetermined behavior identified may be read from the storage unit, a spectrum pattern that has a minimum difference to the spectrum pattern read and reproduces the sound acquired may be estimated, and the spectrum pattern that corresponds to the predetermined behavior and is stored in the storage unit may be updated to the spectrum pattern estimated.

According to this configuration, the spectrum patterns are stored in the storage unit so as to correspond to the behaviors, respectively. Consequently, the spectrum pattern corresponding to the predetermined behavior identified can be read from the storage unit and the spectrum pattern corresponding to the predetermined behavior can be updated to the spectrum pattern estimated.

A behavior identification device according to another aspect of the present disclosure is a behavior identification device that identifies a behavior of a person by sound made by the person, the behavior identification device including a sound pickup unit that acquires surrounding sound, a storage unit that stores a spectrum pattern included in spectrum information generated from sound made by a person performing a predetermined behavior, an extraction unit that extracts a feature value specified by the spectrum pattern stored in the storage unit from the sound acquired, an identification unit that identifies the predetermined behavior by the feature value, and an output unit that outputs information indicating the predetermined behavior identified.

According to this configuration, the feature value specified by the spectrum pattern included in the spectrum information generated from the sound made by the person performing the predetermined behavior is extracted from the surrounding sound acquired and the predetermined behavior is identified by the feature value. Consequently, if the sound other than the sound of the identification target behavior such as noise is included in the surrounding sound acquired, the identification target behavior can be accurately identified from the surrounding sound.

A non-transitory computer-readable recording medium recording therein a behavior identification program according to yet another aspect of the present disclosure is a non-transitory computer-readable recording medium recording therein a behavior identification program for identifying a behavior of a person by sound made by the person, the behavior identification program for causing a computer to execute: acquiring surrounding sound; extracting a feature value that is specified by a spectrum pattern stored in a storage unit and included in spectrum information generated from sound made by a person performing a predetermined behavior from the sound acquired; identifying the predetermined behavior by the feature value; and outputting information indicating the predetermined behavior identified.

According to this configuration, the feature value specified by the spectrum pattern included in the spectrum information generated from the sound made by the person performing the predetermined behavior is extracted from the surrounding sound acquired and the predetermined behavior is identified by the feature value. Consequently, if the sound other than the sound of the identification target behavior such as noise is included in the surrounding sound acquired, the identification target behavior can be accurately identified from the surrounding sound.

A machine learning method according to yet another aspect of the present disclosure is a machine learning method in a machine learning device that machine-learns a behavior identification model for identifying a behavior of a person, the machine learning method including acquiring sound made by a person performing a predetermined behavior as learning sound, estimating a spectrum pattern from spectrum information generated from the learning sound acquired and storing the spectrum pattern estimated in a storage unit, acquiring a behavior label for specifying the predetermined behavior, extracting a feature value that is specified by the spectrum pattern stored in the storage unit from the learning sound acquired, and machine-learning a behavior identification model by using the feature value extracted from the learning sound as an input value and the behavior label acquired as an output value.

According to this configuration, the spectrum pattern that is estimated based on the learning sound that is the sound made by the person performing the predetermined behavior is stored in the storage unit, the feature value that is specified by the spectrum pattern stored in the storage unit is extracted from the learning sound acquired, and the behavior identification model is machine-learned by using the feature value extracted from the learning sound as an input value and the behavior label acquired as an output value. In identification, the feature value specified by the spectrum pattern is extracted from the surrounding sound acquired and input into the behavior identification model, so that the predetermined behavior is identified. Consequently, if the sound other than the sound of the identification target behavior such as noise is included in the surrounding sound acquired, the identification target behavior can be accurately identified from the surrounding sound.

A machine learning device according to yet another aspect of the present disclosure is a machine learning device that machine-learns a behavior identification model for identifying a behavior of a person, the machine learning device including a learning sound acquisition unit that acquires sound made by a person performing a predetermined behavior as learning sound, a spectrum pattern estimation unit that estimates a spectrum pattern from spectrum information generated from the learning sound acquired, a storage unit that stores the spectrum pattern estimated, a behavior label acquisition unit that acquires a behavior label for specifying the predetermined behavior, a feature value extraction unit that extracts a feature value that is specified by the spectrum pattern stored in the storage unit from the learning sound acquired, and a learning unit that machine-learns a behavior identification model by using the feature value extracted from the learning sound as an input value and the behavior label acquired as an output value.

According to this configuration, the spectrum pattern that is estimated based on the learning sound that is the sound made by the person performing the predetermined behavior is stored in the storage unit, the feature value that is specified by the spectrum pattern stored in the storage unit is extracted from the learning sound acquired, and the behavior identification model is machine-learned by using the feature value extracted from the learning sound as an input value and the behavior label acquired as an output value. In identification, the feature value specified by the spectrum pattern is extracted from the surrounding sound acquired and input into the behavior identification model, so that the predetermined behavior is identified. Consequently, if the sound other than the sound of the identification target behavior such as noise is included in the surrounding sound acquired, the identification target behavior can be accurately identified from the surrounding sound.

A non-transitory computer-readable recording medium recording therein a machine learning program according to yet another aspect of the present disclosure is a non-transitory computer-readable recording medium recording therein a machine learning program for machine-learning a behavior identification model for identifying a behavior of a person, the machine learning program for causing a computer to execute: acquiring sound made by a person performing a predetermined behavior as learning sound; estimating a spectrum pattern from spectrum information generated from the learning sound acquired and store the spectrum pattern estimated in a storage unit; acquiring a behavior label for specifying the predetermined behavior; extracting a feature value that is specified by the spectrum pattern stored in the storage unit from the learning sound acquired; and machine-learning a behavior identification model by using the feature value extracted from the learning sound as an input value and the behavior label acquired as an output value.

According to this configuration, the spectrum pattern that is estimated based on the learning sound that is the sound made by the person performing the predetermined behavior is stored in the storage unit, the feature value that is specified by the spectrum pattern stored in the storage unit is extracted from the learning sound acquired, and the behavior identification model is machine-learned by using the feature value extracted from the learning sound as an input value and the behavior label acquired as an output value. In identification, the feature value specified by the spectrum pattern is extracted from the surrounding sound acquired and input into the behavior identification model, so that the predetermined behavior is identified. Consequently, if the sound other than the sound of the identification target behavior such as noise is included in the surrounding sound acquired, the identification target behavior can be accurately identified from the surrounding sound.

These general or specific aspects may be achieved by systems, methods, integrated circuits, computer programs, or recording media including a computer-readable CD-ROM, or may be achieved by any combination of the systems, the methods, the integrated circuits, the computer programs, and the recording media.

An embodiment will be specifically described below with reference to the drawings.

The following embodiment includes general or specific examples. Numeric values, shapes, materials, components, arrangements and connections of the components, steps, orders of the steps, and the like are merely examples, and are not intended to limit the present disclosure. In addition, among the components in the following embodiment, any components that are not described in any independent claims indicating the highest concept of the present disclosure are explained as arbitrary components.

Moreover, each drawing is a schematic view, and is not necessarily drawn accurately. Like reference marks are given to like components throughout the drawings.

Embodiment

Figure 1:
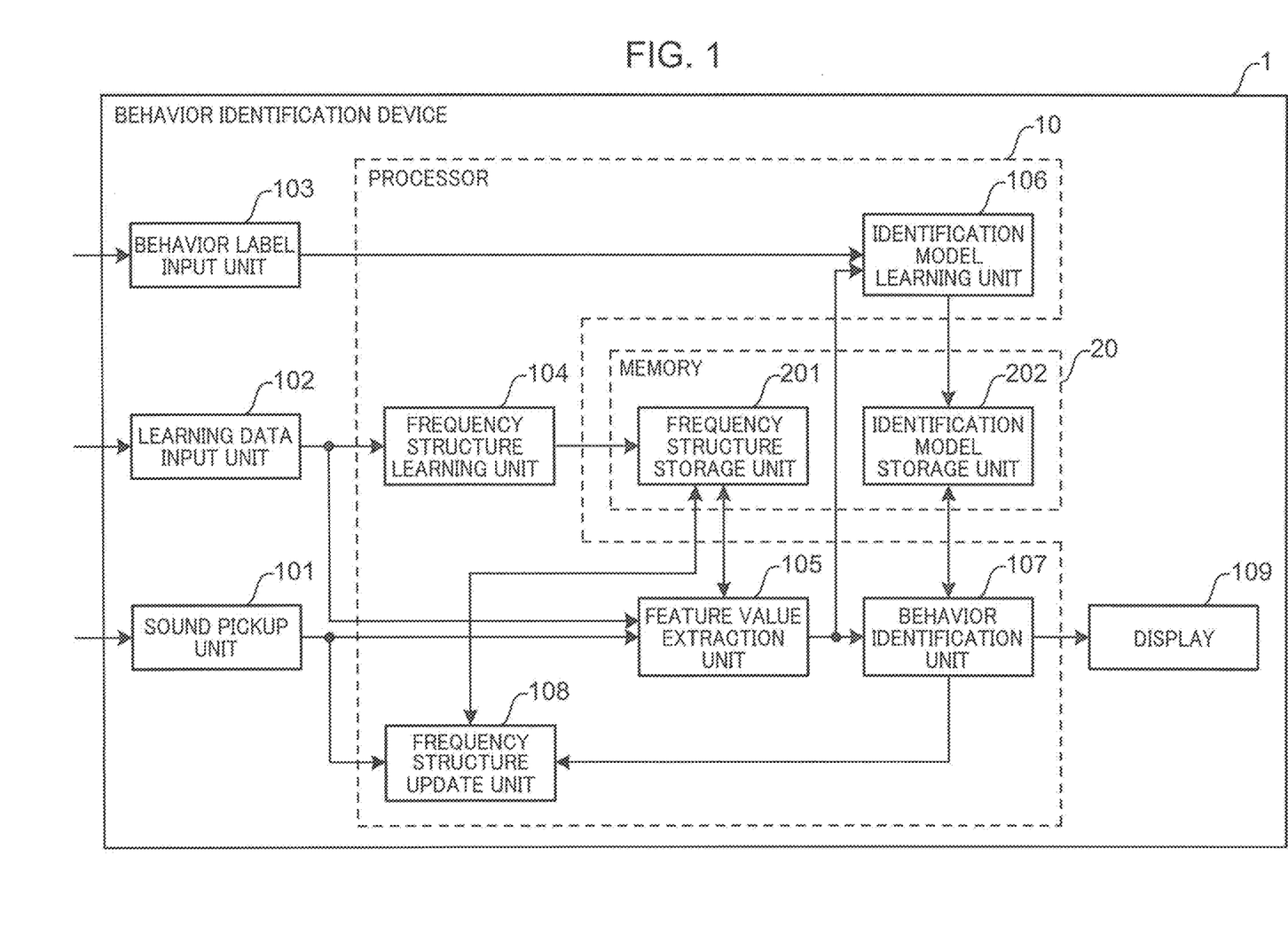
FIG. 1 is a block diagram of a configuration of a behavior identification device according to an embodiment of the present disclosure.
Figure 2:
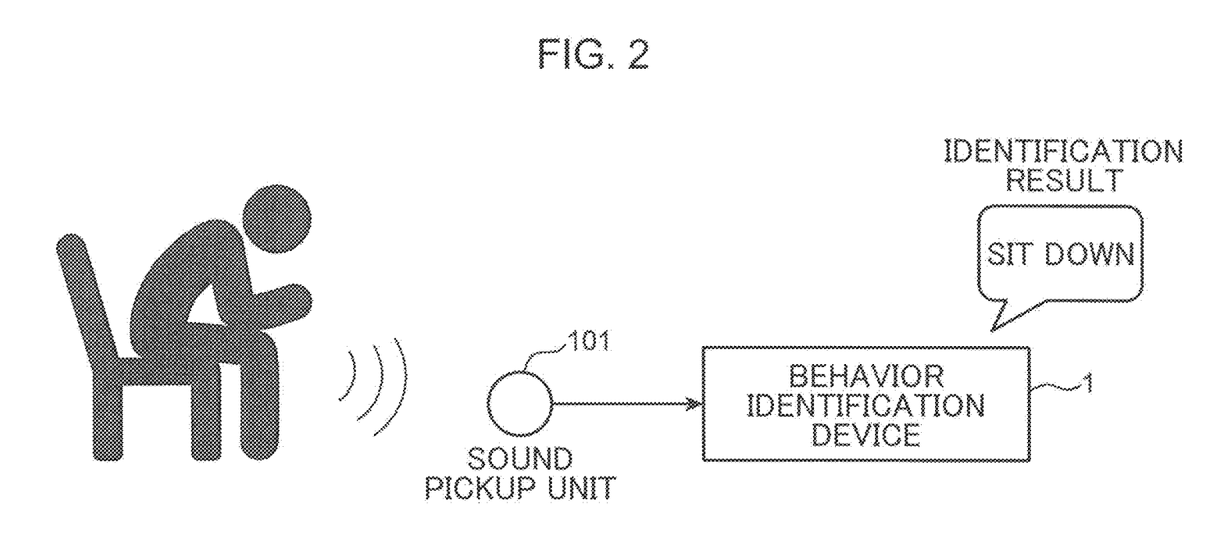
FIG. 2 illustrates an example in which the behavior identification device identifies a behavior in a target space, according to the present embodiment.
Figure 3:
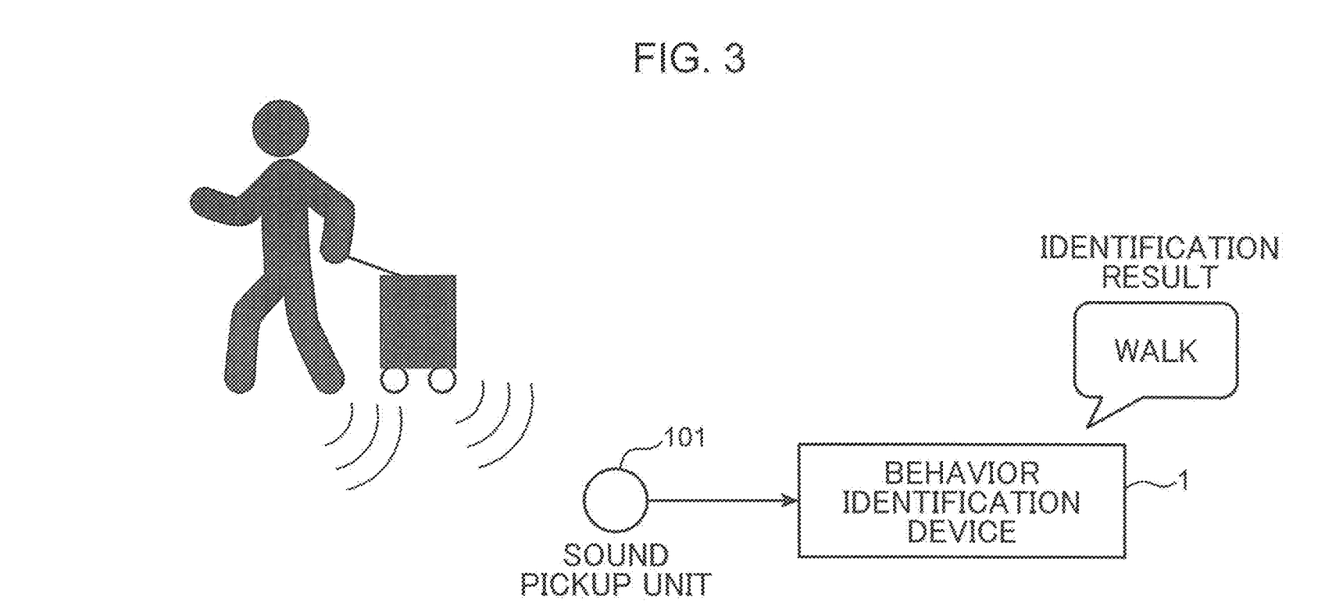
FIG. 3 illustrates another example in which the behavior identification device identifies a behavior in the target space, according to the present embodiment.

FIG. 1 is a block diagram of a configuration of a behavior identification device according to an embodiment of the present disclosure. FIG. 2 illustrates an example in which the behavior identification device identifies a behavior in a target space, according to the present embodiment. FIG. 3 illustrates another example in which the behavior identification device identifies a behavior in the target space, according to the present embodiment.

A flow of a learning operation and an identification operation of a behavior identification device 1 according to the present embodiment will be described first.

In learning, the behavior identification device 1 receives learning data indicating sound used for learning and a behavior label for the learning data. Next, the behavior identification device 1 learns a frequency structure only from the learning data. The behavior identification device 1 then extracts a feature value from the learning data using the learned frequency structure. Finally, the behavior identification device 1 learns a behavior identification model that outputs a behavior label from a feature value using the feature value extracted from the learning data and the behavior label.

In identification, the behavior identification device 1 receives sound data from a microphone. Next, the behavior identification device 1 extracts a feature value from the sound data using the pre-learned frequency structure. The behavior identification device 1 then identifies a behavior from the feature value using the pre-learned behavior identification model.

The behavior identification device 1 learns in advance a frequency pattern generated when a person performs an identification target behavior such as "sit down" and "walk" and the size of the frequency pattern, and holds the learned frequency pattern as a frequency structure.

As illustrated in FIG. 2, a sound pickup unit 101 of the behavior identification device 1 acquires sound made when a person sits down in a target space. The behavior identification device 1 then estimates the level of a pre-learned frequency pattern included in the sound generated and recognizes a behavior that the person sits down based on the level of the frequency pattern and a behavior identification model. A display 109 of the behavior identification device 1 thus displays an identification result "sit down".

As illustrated in FIG. 3, the sound pickup unit 101 of the behavior identification device 1 acquires sound made when a person walks dragging an object in a target space. In this case, the sound pickup unit 101 acquires dragging sound and walking sound at the same time. The behavior identification device 1 estimates the level of a pre-learned frequency pattern included in the sound. However, the dragging sound is not included in the pre-learned frequency pattern, and thus the level of the frequency pattern is affected only by the walking sound. Consequently, if the person walks dragging an object, the behavior identification device 1 recognizes a behavior that the person walks based on the level of the frequency pattern of the walking sound and a behavior identification model. The display 109 of the behavior identification device 1 thus displays an identification result "walk".

The configuration of the behavior identification device 1 according to the present embodiment will be described.

The behavior identification device 1 illustrated in FIG. 1 is, for example, a computer. The behavior identification device 1 includes a processor 10, a memory 20, the sound pickup unit 101, a learning data input unit 102, a behavior label input unit 103, and the display 109.

The processor 10 includes a frequency structure learning unit 104, a feature value extraction unit 105, an identification model learning unit 106, a behavior identification unit 107, and a frequency structure update unit 108. The memory 20 is implemented by an auxiliary storage device such as a hard disk drive (HDD), a random access memory (RAM), and a semiconductor memory. The memory 20 includes a frequency structure storage unit 201 and an identification model storage unit 202.

The sound pickup unit 101 is, for example, a microphone and acquires surrounding sound. The sound pickup unit 101 converts the acquired sound into an electric signal and outputs the electric signal as an audio signal.

In learning prior to identification, the learning data input unit 102 acquires learning data that is sound data for learning. The learning data input unit 102 acquires sound made by a person performing a predetermined behavior as learning data (learning sound). The learning data input unit 102 is, for example, an input interface. The learning data input unit 102 may acquire learning data received from an external device through a network such as the Internet from a communication device, may acquire learning data stored in a recording medium such as an optical disk from a drive device, or may acquire learning data from an auxiliary storage device such as a universal serial bus (USB) memory.

In learning prior to identification, the behavior label input unit 103 acquires a behavior label for specifying a predetermined behavior performed when learning sound included in learning data is made. The behavior label input unit 103 may acquire time information for specifying the time period during which a person performs a behavior, which is included in the learning data, with the behavior label. The behavior label input unit 103 is, for example, an input interface. The behavior label input unit 103 may acquire a behavior label received from an external device through a network such as the Internet from a communication device, or may acquire a behavior label input by a user through an input device such as a keyboard, a mouse, and a touch panel.

The frequency structure learning unit 104 estimates a spectrum pattern from spectrum information generated from learning sound acquired by the learning data input unit 102 and stores the estimated spectrum pattern in the frequency structure storage unit 201. In the present embodiment, the spectrum information is a frequency spectrogram and the spectrum pattern is a frequency pattern repeatedly appearing in the frequency spectrogram.

Figure 4:
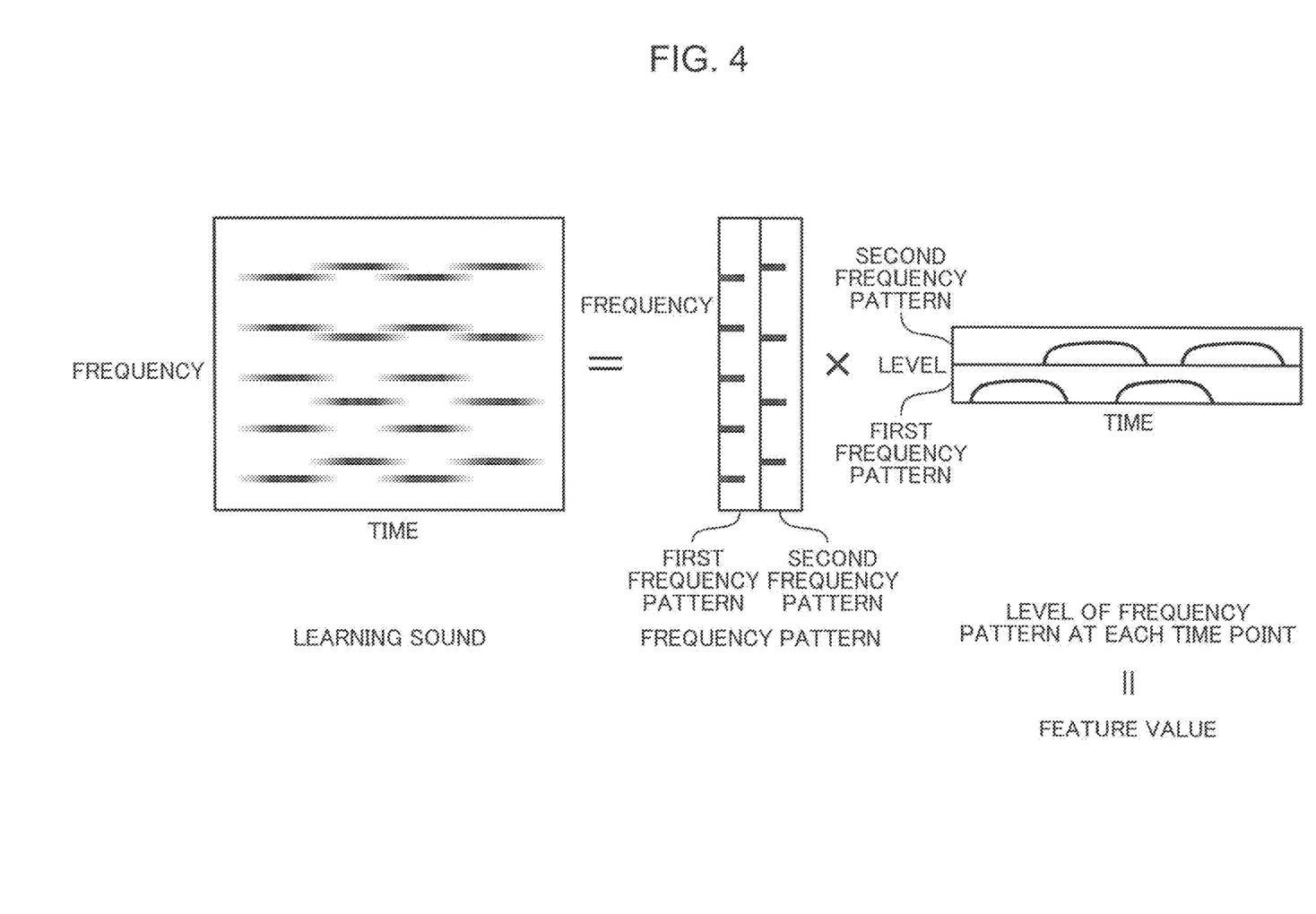
FIG. 4 is a schematic view illustrating a frequency pattern according to the present embodiment.

FIG. 4 is a schematic view illustrating a frequency pattern according to the present embodiment.

Learning sound is converted into a frequency spectrogram in which the horizontal axis represents time, the vertical axis represents a frequency, and the brightness or color represents a level. The frequency structure learning unit 104 generates a frequency spectrogram from learning sound acquired by the learning data input unit 102 and estimates at least one frequency pattern from the frequency spectrogram. The at least one frequency pattern has at least one frequency component and is repeated at a predetermined level and a predetermined time interval.

The frequency spectrogram is decomposed into at least one frequency pattern and the level of the at least one frequency pattern at each time point. That is to say, by multiplying the at least one frequency pattern by the level of the at least one frequency pattern at each time point, the frequency spectrogram of the learning sound is reproduced.

The frequency structure learning unit 104 decomposes the learning sound acquired by the learning data input unit 102, thus estimating a frequency pattern included in the learning sound. As illustrated in FIG. 4, the frequency pattern indicates a frequency component repeatedly appearing on the same timing among a plurality of frequency components constituting the sound. The frequency structure learning unit 104 combines a plurality of frequency patterns to estimate a frequency pattern closest to the learning sound. The frequency pattern of learning sound illustrated in FIG. 4 includes, for example, a first frequency pattern having a plurality of frequency components and a second frequency pattern having a plurality of frequency components different from those of the first frequency pattern. In the example of FIG. 4, a group of frequencies with a similar change in level at each time point is extracted as one frequency pattern. The number of frequency patterns may be fixed or may be automatically estimated. The frequency structure learning unit 104 may independently store a frequency pattern for each target behavior in the frequency structure storage unit 201. Alternatively, the frequency structure learning unit 104 may store frequency patterns for all the target behaviors together in the frequency structure storage unit 201.

The learning sound includes two frequency patterns in the present embodiment. However, the present disclosure is not limited to the case. The learning sound may include one frequency pattern or three or more frequency patterns according to a target behavior performed by a person.

The frequency structure storage unit 201 stores a spectrum pattern included in spectrum information generated from sound made by a person performing a predetermined behavior. In the present embodiment, the frequency structure storage unit 201 stores the frequency pattern of learning sound estimated by the frequency structure learning unit 104. The frequency structure storage unit 201 may store not only the frequency pattern of sound of a target behavior but also the frequency pattern of noise in an environment where identification actually takes place or sound of a behavior other than the target behavior. Alternatively, the frequency structure storage unit 201 may store a plurality of frequency patterns so as to correspond to a plurality of behaviors, respectively or may store only the frequency patterns without corresponding to the behaviors.

In the present embodiment, the spectrum information is a frequency spectrogram and the spectrum pattern is a frequency pattern. However, the present disclosure is not limited to the case. For example, the spectrum information may be a mel-frequency spectrum in which the horizontal axis represents time and the vertical axis represents a filter bank index. In this case, the spectrum pattern may be a filter bank index pattern that indicates a plurality of filter bank indexes repeatedly appearing at a predetermined level on a predetermined timing.

Moreover, the spectrum information may be, for example, a mel-frequency cepstrum in which the horizontal axis represents time and the vertical axis represents a cepstrum index in the present embodiment. In this case, the spectrum pattern may be a cepstrum index pattern that indicates a plurality of cepstrum indexes repeatedly appearing at a predetermined level on a predetermined timing.

Moreover, the spectrum information may be, for example, a mel-frequency cepstrum coefficient (MFCC) in which the horizontal axis represents time and the vertical axis represents a coefficient index in the present embodiment. In this case, the spectrum pattern may be a coefficient index pattern that indicates a plurality of coefficient indexes repeatedly appearing at a predetermined level on a predetermined timing.

The feature value extraction unit 105 extracts a feature value that is specified by using a spectrum pattern that is stored in the frequency structure storage unit 201 and included in spectrum information generated from sound made by a person performing a predetermined behavior from the sound acquired by the sound pickup unit 101. The feature value extraction unit 105 extracts a feature value from the audio signal acquired by the sound pickup unit 101. The feature value indicates the level of a frequency pattern at each time point. Moreover, the feature value extraction unit 105 extracts a feature value that is specified by using a spectrum pattern stored in the frequency structure storage unit 201 from the learning sound acquired by the learning data input unit 102.

The identification model learning unit 106 learns a behavior identification model for estimating the current behavior from the feature value extracted by the feature value extraction unit 105. The identification model learning unit 106 machine-learns a behavior identification model by using the feature value extracted from the learning sound as an input value and the behavior label acquired by the behavior label input unit 103 as an output value. In learning of the behavior identification model, not only the current feature value but also feature values of a few frames in the past may be used at the same time. For the behavior identification model, a deep neural network or a convolutional neural network in a deep learning method may be used. Alternatively, a support vector machine or gaussian mixture distribution in a statistical method may be used. In learning of the behavior identification model, the learning method is used according to a model to be used. For example, backpropagation or maximum likelihood estimation is used.

The identification model storage unit 202 stores a behavior identification model learned by the identification model learning unit 106.

The behavior identification unit 107 identifies a predetermined behavior by using the feature value extracted by the feature value extraction unit 105. The behavior identification unit 107 estimates the current behavior based on the feature value extracted by the feature value extraction unit 105 by using the behavior identification model stored in the identification model storage unit 202. The behavior identification unit 107 identifies a predetermined behavior by inputting the feature value extracted from acquired sound into a behavior identification model established by machine learning using the feature value as an input value and the predetermined behavior as an output value.

The frequency structure update unit 108 updates a frequency pattern stored in the frequency structure storage unit 201 based on a behavior identification result obtained from the behavior identification unit 107, sound obtained from the sound pickup unit 101, and a frequency pattern stored in the frequency structure storage unit 201. After the predetermined behavior is identified, the frequency structure update unit 108 reads a spectrum pattern from the frequency structure storage unit 201, estimates a spectrum pattern that has a minimum difference to the read spectrum pattern and reproduces the acquired sound, and updates the spectrum pattern stored in the frequency structure storage unit 201 to the estimated spectrum pattern.

When the frequency structure storage unit 201 stores a plurality of spectrum patterns so as to correspond to a plurality of behaviors, respectively, the frequency structure update unit 108 may read a spectrum pattern corresponding to a predetermined behavior identified by the behavior identification unit 107 from the frequency structure storage unit 201. The frequency structure update unit 108 may estimate a spectrum pattern that has a minimum difference to the read spectrum pattern and reproduces the acquired sound, and update the spectrum pattern that corresponds to the predetermined behavior and is stored in the frequency structure storage unit 201 to the estimated spectrum pattern.

The display 109 is, for example, a liquid crystal display device and outputs information indicating a predetermined behavior identified by the behavior identification unit 107. The display 109 displays a behavior identification result output from the behavior identification unit 107.

While the display 109 displays the behavior identification result in the present embodiment, the present disclosure is not limited to the case. The behavior identification device 1 may include a speaker and the speaker may notify a user of the behavior identification result through voice.

Moreover, in the present embodiment, the machine learning device may include the learning data input unit 102, the behavior label input unit 103, the frequency structure learning unit 104, the feature value extraction unit 105, the identification model learning unit 106, the frequency structure storage unit 201, and the identification model storage unit 202. Alternatively, the behavior identification device 1 does not necessarily include the learning data input unit 102, the behavior label input unit 103, the frequency structure learning unit 104, and the identification model learning unit 106, but may include only the sound pickup unit 101, the feature value extraction unit 105, the behavior identification unit 107, the frequency structure update unit 108, the display 109, the frequency structure storage unit 201, and the identification model storage unit 202.

Next, processing operations of the behavior identification device 1 according to the present embodiment will be described. The behavior identification device 1 performs two processing operations, that is, a learning operation and an identification operation. The behavior identification device 1 can switch from the learning operation to the identification operation, and vice versa.

In the learning operation, the behavior identification device 1 learns a behavior identification model required to identify a behavior from learning data. The frequency structure learning unit 104 automatically estimates a frequency pattern of sound included in learning sound acquired by the learning data input unit 102. The identification model learning unit 106 learns a behavior identification model for estimating a behavior using the generation level of a frequency pattern extracted by the feature value extraction unit 105.

Figure 5:
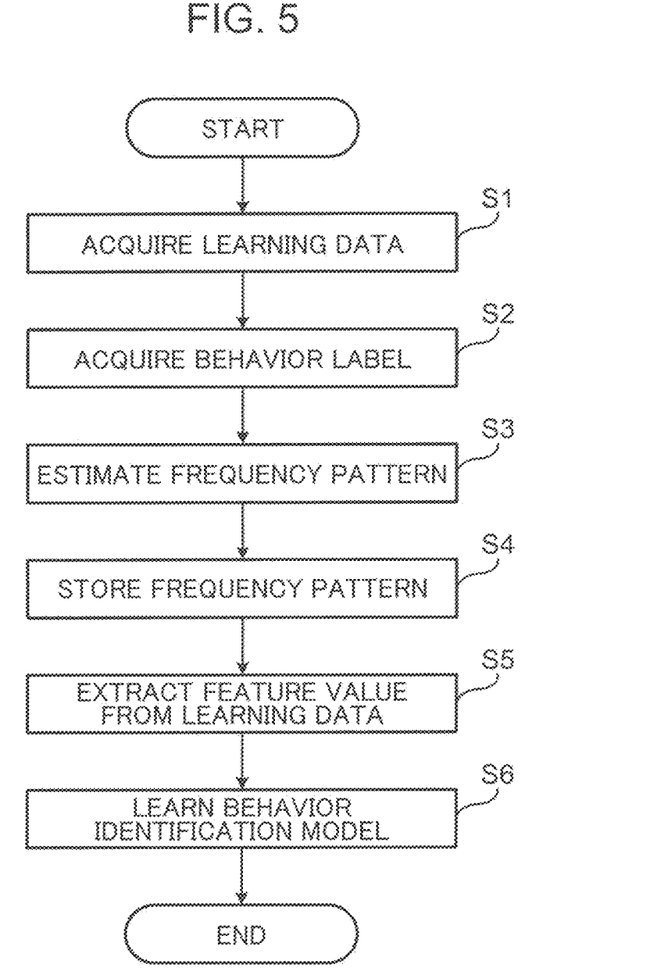
FIG. 5 is a flowchart illustrating an example of a learning operation of the behavior identification device according to the present embodiment.

FIG. 5 is a flowchart illustrating an example of the learning operation of the behavior identification device according to the present embodiment.

First, the learning data input unit 102 of the behavior identification device 1 acquires learning data including learning sound prepared in advance (step S1).

The behavior label input unit 103 then acquires a behavior label for specifying a predetermined behavior performed when the learning sound included in the learning data is made (step S2).

Next, the frequency structure learning unit 104 estimates a frequency pattern from the learning sound acquired by the learning data input unit 102 (step S3). Specifically, the frequency structure learning unit 104 estimates a frequency pattern where when the sound acquired by the learning data input unit 102 is reproduced by using a predetermined number or an automatically estimated number of frequency patterns, the error between the reproduced sound and the acquired sound is minimized. The frequency pattern indicates a plurality of frequency components included at a predetermined level on a predetermined timing. The frequency structure learning unit 104 sets the level of the frequency pattern at each time point to reproduce the acquired sound.

Next, the frequency structure learning unit 104 stores the estimated frequency pattern in the frequency structure storage unit 201 (step S4).

Next, the feature value extraction unit 105 extracts a feature value from the learning data acquired by the learning data input unit 102 using the frequency pattern stored in the frequency structure storage unit 201 (step S5). The feature value indicates the level of a frequency pattern at each time point when the sound closest to the learning sound acquired by the learning data input unit 102 is reproduced using the frequency pattern stored in the frequency structure storage unit 201.

For example, the feature value extraction unit 105 generates a frequency spectrogram from the learning sound acquired by the learning data input unit 102. The frequency structure storage unit 201 stores a plurality of frequency patterns according to an identification target behavior. The feature value extraction unit 105 reproduces the frequency spectrogram of the learning sound by using each of the frequency patterns stored in the frequency structure storage unit 201, specifies a frequency pattern where the error between the reproduced frequency spectrogram and the generated frequency spectrogram is less than or equal to a threshold, and extracts the level of the specified frequency pattern at each time point as the feature value.

Next, the identification model learning unit 106 learns a behavior identification model by using the feature value extracted by the feature value extraction unit 105 and the behavior label acquired by the behavior label input unit 103 (step S6). The behavior identification model is, for example, a deep neural network in the deep learning method or a support vector machine in the statistical method. The behavior identification model is learned by backpropagation according to the behavior identification model. The identification model learning unit 106 stores the learned behavior identification model in the identification model storage unit 202.

As described above, according to the present embodiment, a spectrum pattern that is estimated based on learning sound that is sound made by a person performing a predetermined behavior is stored in the frequency structure storage unit 201, a feature value that is specified by a spectrum pattern stored in the storage unit is extracted from the acquired learning sound, and a behavior identification model is machine-learned by using the feature value extracted from the learning sound as an input value and an acquired behavior label as an output value. In identification, the feature value specified by the spectrum pattern is extracted from the acquired surrounding sound and input into the behavior identification model, so that the predetermined behavior is identified. Consequently, if sound other than the sound of an identification target behavior such as noise is included in the acquired surrounding sound, the identification target behavior can be accurately identified from the surrounding sound.

Figure 6:
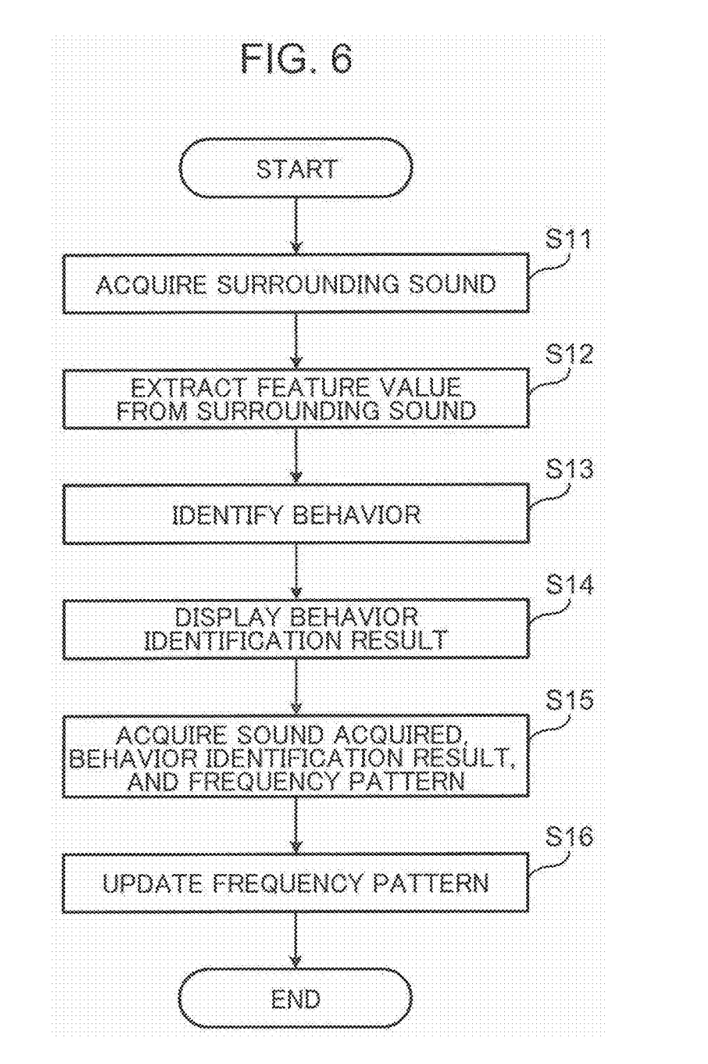
FIG. 6 is a flowchart illustrating an example of an identification operation of the behavior identification device according to the present embodiment.

Next, the identification operation of the behavior identification device 1 will be described. In the identification operation, the behavior identification device 1 extracts a feature value from sound acquired by the sound pickup unit 101 using a frequency pattern stored in the frequency structure storage unit 201 to identify a behavior using a behavior identification model stored in the identification model storage unit 202. The behavior identification device 1 updates a frequency pattern stored in the frequency structure storage unit 201 based on a behavior identification result identified by the behavior identification unit 107, sound acquired by the sound pickup unit 101, and a frequency pattern stored in the frequency structure storage unit 201.

FIG. 6 is a flowchart illustrating an example of the identification operation of the behavior identification device according to the present embodiment.

The sound pickup unit 101 of the behavior identification device 1 acquires surrounding sound (step S11). In this case, the surrounding sound includes sound made by a person performing a behavior. The sound made by a person performing a behavior includes sound made when a person sits down or sound made when a person walks.

Next, the feature value extraction unit 105 extracts a feature value from the surrounding sound acquired by the sound pickup unit 101 using a frequency pattern stored in the frequency structure storage unit 201 (step S12). The feature value indicates the level of the frequency pattern at each time point.

For example, the feature value extraction unit 105 generates a frequency spectrogram from the sound acquired by the sound pickup unit 101. The frequency structure storage unit 201 stores a plurality of frequency patterns according to an identification target behavior. The feature value extraction unit 105 reproduces the frequency spectrogram of the sound by using each of the frequency patterns stored in the frequency structure storage unit 201, specifies a frequency pattern where the error between the reproduced frequency spectrogram and the generated frequency spectrogram is less than or equal to a threshold, and extracts the level of the specified frequency pattern at each time point as the feature value.

Next, the behavior identification unit 107 identifies a behavior by using the feature value extracted by the feature value extraction unit 105 and a behavior identification model stored in the identification model storage unit 202 (step S13). Specifically, the behavior identification unit 107 gives the feature value extracted by the feature value extraction unit 105 to the behavior identification model stored in the identification model storage unit 202 as an input value, thus acquiring a behavior content output from the behavior identification model as a behavior identification result.

Next, the display 109 displays the behavior identification result by the behavior identification unit 107 (step S14). In this case, the display 109 displays information indicating the identified behavior.

Next, the frequency structure update unit 108 acquires the surrounding sound from the sound pickup unit 101, the behavior identification result from the behavior identification unit 107, and the frequency pattern corresponding to the behavior as the behavior identification result from the frequency structure storage unit 201 (step S15). The frequency structure storage unit 201 stores a frequency pattern so as to correspond to a behavior.

The frequency structure update unit 108 then estimates a frequency pattern in which the difference from the frequency pattern acquired from the frequency structure storage unit 201 is minimized and the sound acquired by the sound pickup unit 101 is reproduced most accurately, and updates the frequency pattern stored in the frequency structure storage unit 201 to the estimated frequency pattern (step S16). Specifically, the frequency structure update unit 108 estimates a frequency pattern in which the difference between the frequency pattern stored in the frequency structure storage unit 201 and the frequency pattern after estimation is minimized and the error between the sound obtained by reproducing the sound acquired by the sound pickup unit 101 using the frequency pattern after estimation and the acquired sound is minimized. The frequency structure update unit 108 then updates the frequency pattern stored in the frequency structure storage unit 201 to the estimated frequency pattern.

The frequency structure update unit 108 may calculate the sum of the difference between the frequency pattern acquired from the frequency structure storage unit 201 and the frequency pattern after estimation and the error between the sound obtained by reproducing the sound acquired by the sound pickup unit 101 using the frequency pattern after estimation and the acquired sound, and estimate a frequency pattern so that the calculated sum is minimized.

As described above, according to the present embodiment, the feature value specified by a spectrum pattern included in spectrum information generated from sound made by a person performing a predetermined behavior is extracted from the acquired surrounding sound and the predetermined behavior is identified by the feature value. Consequently, if sound other than the sound of an identification target behavior such as noise is included in the acquired surrounding sound, the identification target behavior can be accurately identified from the surrounding sound.

The behavior identification device 1 according to the present embodiment focuses on the frequency structure of sound, and estimates and stores the frequency pattern of sound made when the identification target behavior is performed, thus estimating the level of a frequency pattern included in picked up sound and identifying the behavior from the estimated level of the frequency pattern. Consequently, unlike conventional identification devices, the identification result is not affected by a change in sound pickup performance due to unexpected sound such as noise being generated. Moreover, it is possible to identify a behavior by using a feature value that is not affected by the unexpected sound. As a result, it is possible to improve the performance of identifying a behavior of a person in an environment with a variety of sound.

In the present embodiment, not only the frequency pattern of sound of an identification target behavior but also the frequency pattern of noise may be estimated. That is to say, the learning data input unit 102 may acquire the noise as learning data. The frequency structure learning unit 104 may estimate the frequency pattern of the noise from a frequency spectrogram generated from the learning data of the noise acquired by the learning data input unit 102 and store the estimated frequency pattern of the noise in the frequency structure storage unit 201. In identification, the feature value extraction unit 105 may remove the frequency pattern of the noise stored in the frequency structure storage unit 201 from the sound acquired by the sound pickup unit 101 and extract the feature value corresponding to only the frequency pattern of the sound of the identification target behavior.

As compared to the case where only the frequency pattern of the sound of the identification target behavior is stored, the noise can be removed more accurately and the behavior can be identified using only the sound of the identification target.

As the behavior identification model identifies a behavior only from the level of each frequency pattern, the frequency structure of identification target sound may change due to an environmental change. However, the present embodiment is configured to estimate the frequency pattern again using an identification result, and thus can handle the environmental change.

In the embodiment described above, each component may be configured by dedicated hardware or may be achieved by executing a software program suitable for each component. Alternatively, each component may be achieved by a program execution unit such as a CPU and a processor reading a software program stored in a recording medium such as a hard disk and a semiconductor memory and executing the software program.

Some or all of functions of devices according to the embodiment of the present disclosure may be achieved as large scale integration (LSI), which is typically an integrated circuit. Each function may be made into one chip or some or all of the functions may be made into one chip. The integrated circuit is not limited to LSI and may be achieved by a dedicated circuit or a general-purpose processor. Field programmable gate array (FPGA) capable of being programmed after manufacturing LSI or a reconfigurable processor capable of reconfiguring the connection and setting of circuit cells in LSI may be used.

Some or all of the functions of the devices according to the embodiment of the present disclosure may be achieved by a processor such as a CPU executing a program.

The numbers used in the above description are only illustrative for specifically describing the present disclosure, and the present disclosure is not limited to the numbers illustrated.

The order of steps in the flowcharts described above is illustrative for specifically describing the present disclosure, and may be orders other than the order described above as long as similar effects are achieved. Some of the steps may be performed simultaneously (in parallel with) other steps.

In the behavior identification method, the behavior identification device, and the non-transitory computer-readable recording medium recording therein a behavior identification program according to the present disclosure, if sound other than sound of an identification target behavior such as noise is included in surrounding sound acquired, the identification target behavior can be accurately identified from the surrounding sound. Consequently, the behavior identification method, the behavior identification device, and the non-transitory computer-readable recording medium recording therein a behavior identification program according to the present disclosure are useful as a behavior identification method and a behavior identification device that identify the behavior of a person by sound made by the person, and a non-transitory computer-readable recording medium recording therein a behavior identification program.

In the machine learning method, the machine learning device, and the non-transitory computer-readable recording medium recording therein a machine learning program according to the present disclosure, if sound other than sound of an identification target behavior such as noise is included in surrounding sound acquired, the identification target behavior can be accurately identified from the surrounding sound. Consequently, the machine learning method, the machine learning device, and the non-transitory computer-readable recording medium recording therein a machine learning program according to the present disclosure are useful as a machine learning method and a machine learning device that machine-learn a behavior identification model for identifying the behavior of a person, and a non-transitory computer-readable recording medium recording therein a machine learning program.

This application is based on Japanese Patent application No. 2018-217156 filed in Japan Patent Office on Nov. 20, 2018, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. A behavior identification method in a behavior identification device that identifies a behavior of a person by sound made by the person, the behavior identification method comprising:
   acquiring surrounding sound;
   extracting a feature value that is specified by a spectrum pattern stored in a memory and included in spectrum information generated from sound made by a person performing a predetermined behavior from the sound acquired;
   identifying the predetermined behavior by the feature value;
   outputting information indicating the predetermined behavior identified; and
   after identifying the predetermined behavior, reading the spectrum pattern from the memory, estimating a spectrum pattern that has a minimum difference to the spectrum pattern read and reproduces the sound acquired, and updating the spectrum pattern stored in the memory to the spectrum pattern estimated.

2. The behavior identification method according to claim 1, wherein in the identification, the predetermined behavior is identified by inputting the feature value into a behavior identification model established by machine learning using the feature value as an input value and the predetermined behavior as an output value.

3. The behavior identification method according to claim 1, wherein
   the spectrum information is a frequency spectrogram,
   the spectrum pattern is a frequency pattern repeatedly appearing in the frequency spectrogram, and
   the feature value is a level of the frequency pattern at each time point.

4. The behavior identification method according to claim 1, further comprising:
   acquiring sound made by the person performing the predetermined behavior as learning sound; and
   estimating a spectrum pattern from spectrum information generated from the learning sound acquired and storing the spectrum pattern estimated in the memory.

5. The behavior identification method according to claim 4, further comprising:

acquiring a behavior label for specifying the predetermined behavior when the learning sound is made;

extracting a feature value that is specified by the spectrum pattern stored in the memory from the learning sound acquired; and machine-learning a behavior identification model by using the feature value extracted from the learning sound as an input value and the behavior label acquired as an output value, wherein in the identification, the predetermined behavior is identified by inputting the feature value extracted from the sound acquired into the behavior identification model.

6. The behavior identification method according to claim 1, wherein the memory stores a plurality of spectrum patterns so as to correspond to a plurality of behaviors, respectively, in the update, the spectrum pattern corresponding to the predetermined behavior identified is read from the memory, a spectrum pattern that has a minimum difference to the spectrum pattern read and reproduces the sound acquired is estimated, and the spectrum pattern that corresponds to the predetermined behavior and is stored in the memory is updated to the spectrum pattern estimated.

7. A behavior identification device that identifies a behavior of a person by sound made by the person, the behavior identification device comprising:

a microphone that acquires surrounding sound;

a memory that stores a spectrum pattern included in spectrum information generated from sound made by a person performing a predetermined behavior;

a processor that extracts a feature value specified by the spectrum pattern stored in the memory from the sound acquired, identifies the predetermined behavior by the feature value, and, after identifying the predetermined behavior, reads the spectrum pattern from the memory, estimates a spectrum pattern that has a minimum difference to the spectrum pattern read and reproduces the sound acquired, and updates the spectrum pattern stored in the memory to the spectrum pattern estimated; and a display that outputs information indicating the predetermined behavior identified.

8. A non-transitory computer-readable recording medium recording therein a behavior identification program for identifying a behavior of a person by sound made by the person, the behavior identification program for causing a computer to execute:

acquiring surrounding sound;

extracting a feature value that is specified by a spectrum pattern stored in a memory and included in spectrum information generated from sound made by a person performing a predetermined behavior from the sound acquired;

identifying the predetermined behavior by the feature value;

outputting information indicating the predetermined behavior identified; and after identifying the predetermined behavior, reading the spectrum pattern from the memory, estimating a spectrum pattern that has a minimum difference to the spectrum pattern read and reproduces the sound acquired, and updating the spectrum pattern stored in the memory to the spectrum pattern estimated.

* * * * *